United States Patent
Lacroix et al.

(10) Patent No.: US 6,926,312 B2
(45) Date of Patent: Aug. 9, 2005

(54) QUICK COUPLER FOR REMOVABLY JOINING TWO PIPES

(75) Inventors: Jean-Jacques Lacroix, Lovagny (FR); Olivier Pastore, Faverges (FR)

(73) Assignee: Staubli Faverges, Faverges (FR)

( * ) Notice: Subject to any disclaimer, the term of this patent is extended or adjusted under 35 U.S.C. 154(b) by 11 days.

(21) Appl. No.: 10/713,276

(22) Filed: Nov. 17, 2003

(65) Prior Publication Data

US 2004/0094956 A1 May 20, 2004

(30) Foreign Application Priority Data

Nov. 19, 2002 (FR) .............................................. 02 14466

(51) Int. Cl.⁷ ................................................ F16L 39/00
(52) U.S. Cl. ...................................... 285/317; 285/924
(58) Field of Search ........................ 285/924, 81, 148.2, 285/39, 308–310, 313, 317

(56) References Cited

U.S. PATENT DOCUMENTS

| 5,002,254 A | 3/1991 | Belisaire et al. |
|---|---|---|
| 5,806,832 A | 9/1998 | Larbuisson |
| 6,332,773 B1 * | 12/2001 | Kuhn ........................... 285/317 |
| 6,626,465 B2 * | 9/2003 | Lacroix et al. .............. 285/317 |
| 2002/0140228 A1 * | 10/2002 | Lacroix et al. .............. 285/317 |
| 2004/0094739 A1 * | 5/2004 | Lacroix et al. ........... 251/149.1 |

FOREIGN PATENT DOCUMENTS

FR        2767899 A1 *     9/1999

* cited by examiner

*Primary Examiner*—Aaron Dunwoody
(74) *Attorney, Agent, or Firm*—Dowell & Dowell, P.C.

(57) ABSTRACT

A quick coupler for joining two pipes that includes a male element adapted to be fitted into a female element and maintained in position by a latch forming a stop and opposing withdrawal of the male element. A movable safety member maintains the latch in a blocked position, under the force of pressure of fluid in the coupler, by the cooperation of two surfaces provided, one on the latch and one on the safety member, that are forced into engagement with one another. The safety member releases the latch when a residual pressure in the coupler drops to a safe level.

10 Claims, 4 Drawing Sheets

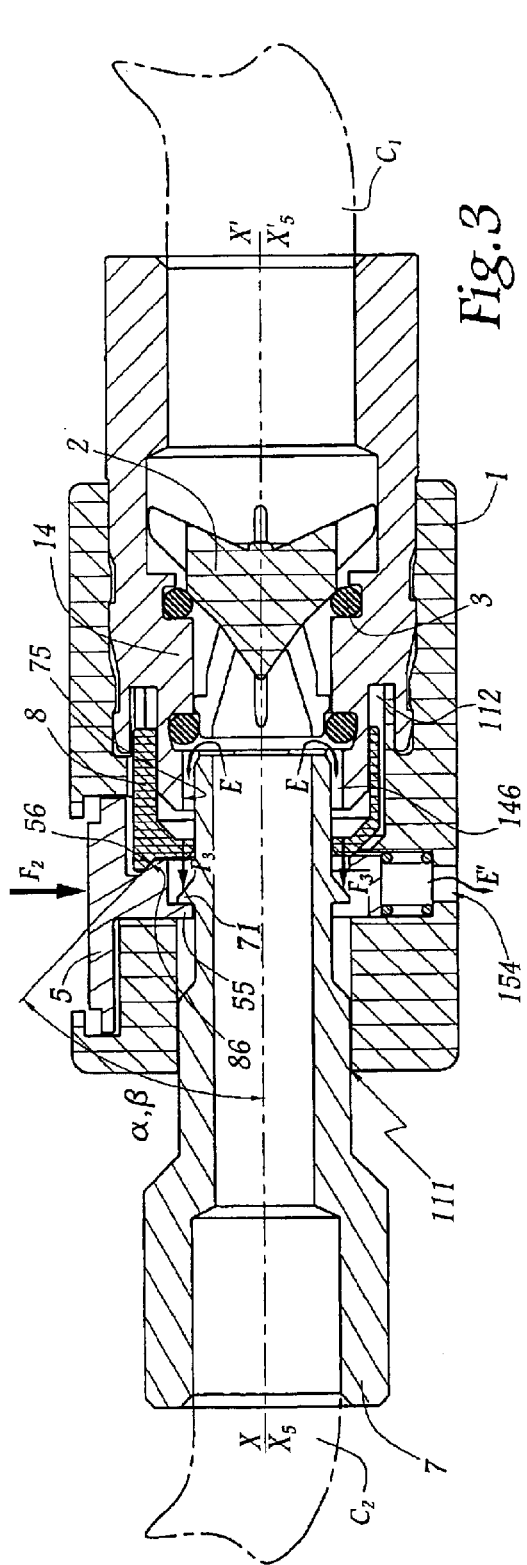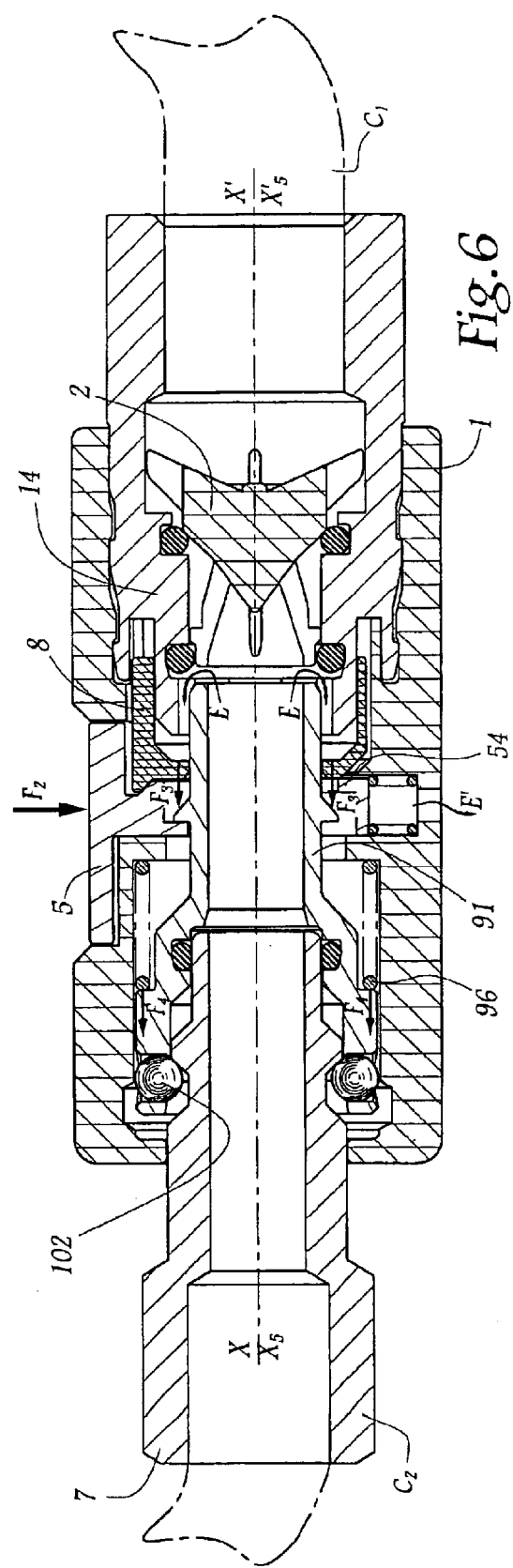

QUICK COUPLER FOR REMOVABLY JOINING TWO PIPES

BACKGROUND OF THE INVENTION

1. Field of the Invention

The present invention relates to a quick coupler for the removable join of pipes conveying fluid under pressure.

2. Brief Description of the Related Art

Patent FR-2 514 855 discloses a quick coupler which comprises two elements, male and female, adapted to fit axially, provoking the opening of a closure valve mounted in the body of the female element, this body being equipped with a loaded latch or button, mounted to slide in this body and pierced with a central opening for fit of the male element. The wall of the opening of the latch presents teeth offset with respect to one another along a median axis of this opening, while the male element is provided with a shoulder adapted to rest selectively against one or the other of these teeth. When the coupler is in configuration for passage of fluid, a first tooth of the latch maintains the male element in place in the female element. When the coupler is unlocked, the latch is displaced in order to release the male element which then comes into abutment on that tooth of the latch nearest the opening of the female element.

This conventional arrangement is satisfactory from the standpoint of robustness and reliability.

However, a powerful spring must be used for elastically loading the latch towards a position in which it retains the male element, which may prove awkward when the latch is being manipulated and when the coupler is being coupled, as the effort generated by the spring must be overcome in order to allow the introduction of the male element in the female element.

In addition, Patents FR-2 724 710 or U.S. Pat. No. 5,806,832 disclose a quick coupler comprising a female element in which a male element is inserted. A latch provided on the female element comprises a catching member associated with balls engaging in a groove of the male element in order to maintain these elements in position of coupling. When, by a movement of translation of the latch, the catching member is disengaged from the groove in order to uncouple these elements, a safety device maintains the balls in position as long as the pressure exerted by the fluid inside the pipes is high. This safety device comprises a piston subjected, on the one hand, to the action of a return spring, and, on the other hand, to the effect of the pressure exerted by the fluid circulating in the coupler. These two actions are antagonistic and have the effect of maintaining the piston in a position where it makes it possible to immobilize the male element thanks to the balls as long as the internal pressure remains high.

However, such a coupler presents drawbacks:

In order to ensure that the pressure on one side of the piston is higher than the pressure on the other side, the piston must be equipped with two sealing rings which brake its displacement and oppose the action of the spring. This may disturb the functioning of the coupler.

It is a particular object of the present invention to overcome these drawbacks by proposing a coupler between pipes conveying fluids under pressure, which can be uncoupled in complete safety when the pressure inside the male element is low.

SUMMARY OF THE INVENTION

To that end, the invention relates to a quick coupler for the removable join of two pipes through which a fluid under pressure passes, this coupler comprising two elements, male and female, adapted to fit axially in each other, the body of the female element being equipped with a latch loaded by elastic means, mounted to slide in the body of the female element and pierced with an opening for the fit of the male element or of a piece displaced by that element, the wall of the opening of the latch being equipped with teeth offset with respect to one another, along a median axis of this opening, while the male element or the afore-mentioned piece is provided with a shoulder adapted to rest selectively against one of these teeth. This coupler is characterized in that it comprises a safety member subjected to the action of the pressure exerted by the fluid and provided with a surface adapted to come into abutment on a complementary surface of the latch and to block the movement of this latch against the afore-mentioned elastic means.

Thanks to the invention, the latch is blocked in a configuration where it prevents an anticipated release of the male element as long as the surface of the safety member is in abutment on the complementary surface of the latch. The latch can completely release the male element, inserted in the female element, only when this movement of unlocking is rendered possible by the displacement of the safety member. A device is thus produced whose functioning is secured and which does not allow uncoupling, accidental or otherwise, of the male and female elements when the coupler is under pressure, whereby a user might be injured. Such a coupler is also easy to construct and therefore of relatively low cost, as it uses few parts.

According to advantageous but non-obligatory aspects of the invention, the coupler incorporates one or more of the following characteristics:

- The safety member is mobile with respect to the body of the female element, essentially under the effect of the pressure exerted by the fluid and under the effect of an effort of reaction exerted by the latch. The control of position of this safety member, under the effect of the pressure or of the reaction of the latch, makes it possible to obtain its return to a position which releases the latch only when the pressure exerted by the fluid inside the coupler is low, and even zero.
- The surfaces formed respectively on the safety member and on the latch are inclined with respect to the direction of relative displacement of the male and female elements and with respect to the direction of slide of the latch in the body of the female element. These surfaces are advantageously inclined towards an axis parallel to the longitudinal axis of the coupler in the direction of upstream of the coupler.
- The safety member is formed by a piston moving in a direction substantially parallel to the direction of relative displacement of the male and female elements. This piston may comprise an orifice adapted to allow the passage of the male element or of the piece displaced by that element. The piston advantageously slides in a guiding recess made in the body of the female element.
- The latch return means is adapted to provoke separation of the abutting surfaces of the latch and of the safety member, when the pressure exerted by the fluid in the coupler is this side of a pre-established value.
- The body of the female element comprises a principal part in which is immobilized a secondary part of the female element connected to one of the pipes, such immobilization being effected by catches borne by the secondary part catching with complementary catches borne by the principal part.

An intermediate piece adapted to receive the body of the male element and provided with means for locking this body is provided in the female element, the aforementioned locking means being adapted to release the body of the male element when the latch is displaced under the effect of the afore-mentioned elastic means. This intermediate piece is advantageously loaded towards a position where the afore-mentioned locking means are not active.

BRIEF DESCRIPTION OF THE DRAWINGS

The invention will be more readily understood on reading the following description of two forms of embodiment of a coupler according to the invention, given solely by way of example and made with reference to the accompanying drawings, in which:

FIG. 3 is a section similar to FIG. 1 but on a smaller scale, a blocking latch being in the same position as in FIG. 2, while a safety member blocks the latch during a phase of reduction of the pressure prevailing in the aforementioned pipe.

FIG. 6 is a section similar to FIG. 3 and on the same scale, for the coupler of FIG. 5.

DESCRIPTION OF PREFERRED EMBODIMENTS

Figure 1:
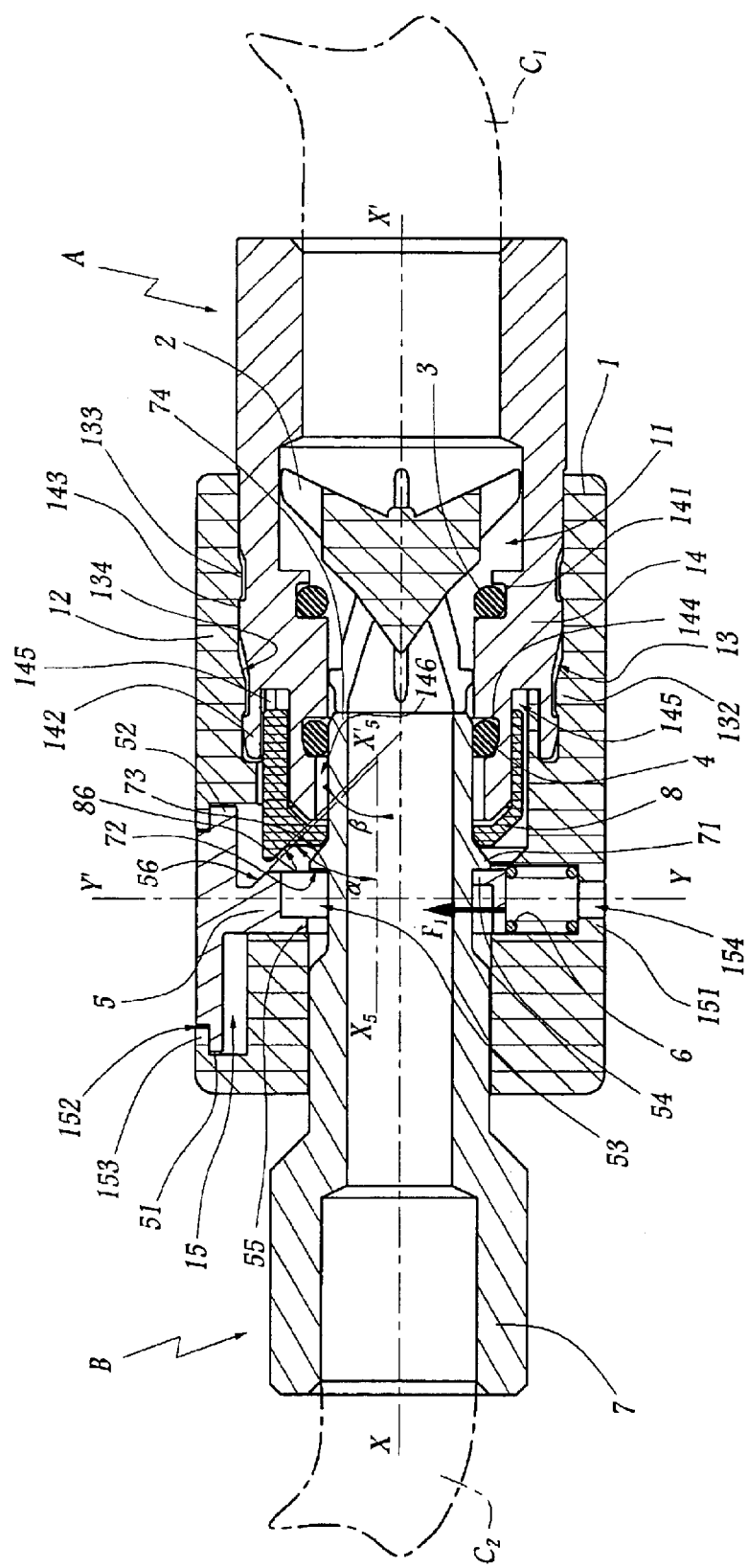
FIG. 1 is a longitudinal section through a coupler according to the invention in a first position where its male and female elements are coupled, the fluid circulating between these two elements.

Referring now to the drawings, the coupler shown in FIGS. 1 to 4 comprises a female element A and a male element or connector B connected respectively to an upstream pipe $C_1$ and to a downstream pipe $C_2$. The upstream pipe $C_1$ is itself connected to a source of fluid under pressure (not shown).

The outside shape of the body 1 of the female element is substantially cylindrical and circular, centred on an axis X–X' which is also the longitudinal axis of a conduit 11 inside the body 1 and in which is arranged a valve 2 mobile along axis X–X'. The body 1 is in two parts and comprises a principal part 12 forming a bore 13 in which is immobilized a secondary part 14 fast with the pipe $C_1$. In practice, the valve 2 is mounted in part 14 which defines a groove 141 for receiving an O-ring 3 for seal of the valve 2.

The outer radial surface of part 14 is provided with catches 142 and 143 intended to cooperate with catches 132 and 133 provided on the inner radial surface 134 of the bore 13. Cooperation of the notches 132, 133, 142, 143 allows a firm immobilization of part 14 in the bore 13 of part 12.

In a variant, the relative immobilization of parts 12 and 14 might be obtained by screwing these parts which are advantageously made of metal.

Part 14 defines a second groove 144 for receiving an O-ring 4 intended to cooperate with the outer radial surface 75 of the body 7 of the male element B.

The body 1 is also provided with a housing 15 extending substantially in the direction of an axis Y–Y' perpendicular to axis X–X', i.e. radial. The housing 15 is made in part 12 of the body. Inside the housing 15 is slidably mounted a latch 5 on which a spring 6 exerts an elastic effort F1 directed opposite the bottom 151 of the housing 15, i.e. in the direction of its opening 152. The movement of the latch 5 under the effect of the effort $F_1$ is limited by two projections 51 and 52 coming into abutment against the edge 153 of the opening 152. The bottom 151 of the housing 15 is provided with an orifice 154 connecting the housing 15 to the ambient atmosphere.

The housing 15 intersects the conduit 11 which traverses part 12 right through.

The latch 5 is provided with a transverse opening 53 centred on an axis $X_5$–$X'_5$ parallel to axis X–X'. The opening 53 is bordered by two teeth 54 and 55 which extend from the circumference of the opening 53 in the direction of axis $X_5$–$X'_5$. Tooth 54 is the most remote from the opening 111 of the conduit 11 on the male connector B side, while tooth 55 is nearest this opening.

In the configuration of FIG. 1, and in the absence of effort exerted on the latch 5 by a user, this latch is subjected to the action of the spring 6, with the result that its tooth 54 is inserted to the rear of a shoulder 72 formed by a flange 71 provided on the periphery of the metal body 7 of the male connector B. The flange 71 is also provided with an inclined ramp 73 which is truncated and convergent in the direction of the front end 74 of the body 7.

Figure 2:
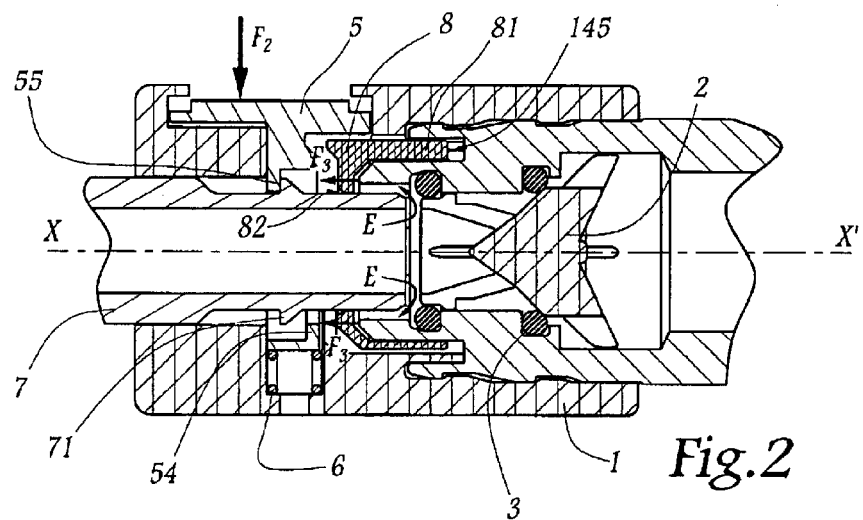
FIG. 2 is a section similar to FIG. 1, but on a smaller scale, in a second position where the male and female elements are maintained in configuration of decompression of a pipe connected on the male element by pressure on the retaining button or latch; certain elements are truncated in order to render the drawing clearer.
Figure 4:
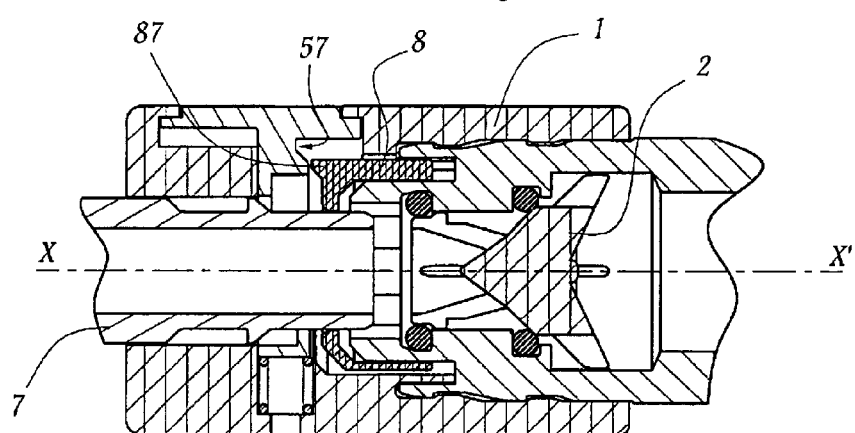
FIG. 4 is a section similar to FIG. 2, while the safety member is in rest position, the internal pressure being low, the male element being able to be freely withdrawn from the coupler.

When the coupler is to be unlocked, an effort $F_2$ is exerted on the latch 5, this having the effect of retracting the tooth 54 from the path of withdrawal of the flange 71, as shown in FIG. 2. Under the effect of the pressure prevailing in the pipe $C_2$, the valve is pushed towards the O-ring 3. The connector 7 moves along axis X–X' in the same direction and the flange 71 comes into abutment against the tooth 55 of the latch or button 5.

A piston 8 is in place in the conduit 11 of the body 1, this piston being able to slide in the direction of axis X–X'. The piston 8 comprises a skirt 81 engaged in a housing 145 formed in part 14 and in a part 112 of the conduit 11 defined between parts 12 and 14 of the body 1. The cooperation of the skirt 81 and of the housing 145 makes it possible to guide the piston 8 in translation.

This piston 8 is provided with a central opening 82 allowing the passage of the connector 7, with the result that the piston 8 is disposed around the connector 7, inside the conduit 11 and in a part of this conduit defined by parts 12 and 14 in the configurations of FIGS. 1 to 4. The fact that the body 1 is in two parts allows the piston to be placed in position and imprisoned in the conduit 11.

The opening 82 has a shape and dimensions close to the outer transverse dimensions of the front part of the connector 7. In this way, from the configuration of FIG. 2, the fluid under pressure located in the pipe $C_2$ flows, as represented by arrows E, around the connector 7, in a passage 146 formed between the inner radial surface of part 14 and the outer radial surface 75 of the connector 7, to such a point that the pressure of the fluid present in the pipe $C_2$ and in the connector 7 exerts on the piston 8 an effort $F_3$ which pushes the piston 8 in the direction of the latch 5, in order to attain the position of FIG. 3.

The latch 5 is provided with a surface 56 which is in the form of a frusto-conical sector, centred on axis $X_5$–$X'_5$ and convergent in the direction of the valve 2, i.e. upstream of the coupler.

As for the piston 8, it is provided with a surface 86 likewise in the form of a frusto-conical sector, centred on axis X–X' and convergent in the direction of upstream of the coupler. $\alpha$ and $\beta$ respectively denote the semi-vertex angles of these surfaces 56 and 86. Angles $\alpha$ and $\beta$ have the same value, which is of the order of 45°.

The surfaces 56 and 86 might have a geometry other than a frusto-conical sector. It might be question of parts of complementary rectilinear teeth orthogonal to axis X–X' and provided with an oblique face with respect thereto.

The displacement of the latch 5 under the effect of the effort $F_2$ has the effect of aligning the axis $X_5$–$X'_5$ on axis X–X', with the result that, under the effect of the effort $F_3$, the surface 86 of the piston 8 comes into abutment against the surface 56 of the latch 5, this immobilizing this latch in the position of FIG. 3 where it prevents the release of the connector 7 as long as the effort $F_3$, generated by the pressure prevailing inside the pipe $C_2$ and the connector 7, is greater than a predetermined value which depends on the effort $F_1$, i.e. on the stiffness constant of the spring 6, and this independently of the effort $F_2$ which may in that case be exerted, or not, on the latch or button 5.

In practice, leakages occur at the join between the edge of the opening 82 and the surface 75 and around the skirt 81, such leakages resulting in a flow E' of gas under pressure towards the outside of the housing 15, through the orifice 154. In this way, the pressure in the pipe $C_1$ and in the connector 7 decreases progressively, in the same way as the effort $F_3$ which may in that case be overcome by the effort $F_1$ exerted by the spring 6, this then causing slide of the surfaces 56 and 86 on each other, the return of the piston 8 in the direction of the bottom of the housing 145 and the release of the latch 5 which then attains the position of FIG. 4 where its tooth 55 no longer opposes the withdrawal of the male element B with respect to the female element A.

The surface 86 is formed by a nose 87 of the piston 8 which may engage in a recess 57 provided to that end on the latch 5.

The movements of translation of the piston 8 parallel to axis X–X' result from the variations in pressure in the conduit 11 of the reaction effort transmitted between the surfaces 56 and 86, without it being necessary to use a return spring, this improving reliability of the coupler and increasing its economic performances.

The upstream-convergent nature of the surfaces 56 and 86 allows the piston to return towards the housing 145 under the effect of the effort $F_1$ when the latter overcomes effort $F_3$.

The inclined surface 56 of the latch 5 has such a slope and orientation that they facilitate the disengagement of the nose 87 borne by the piston 8 during the movement of the latch 5. Depending on the geometry and inclination of the surfaces 56 and 86, disengagement occurs more or less easily as a function of the remaining residual pressure, this for the same spring 13. The coupler 1 may thus be "calibrated" in order that uncoupling is possible from a given residual internal pressure.

Figure 7:
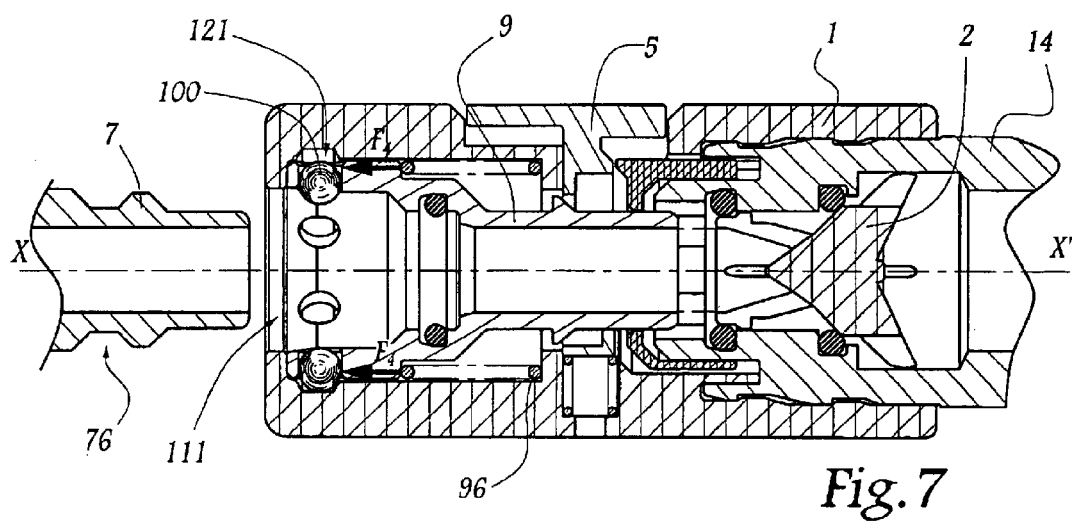
FIG. 7 is a section similar to FIG. 4 and on the same scale, for the coupler of FIGS. 5 and 6.
Figure 5:
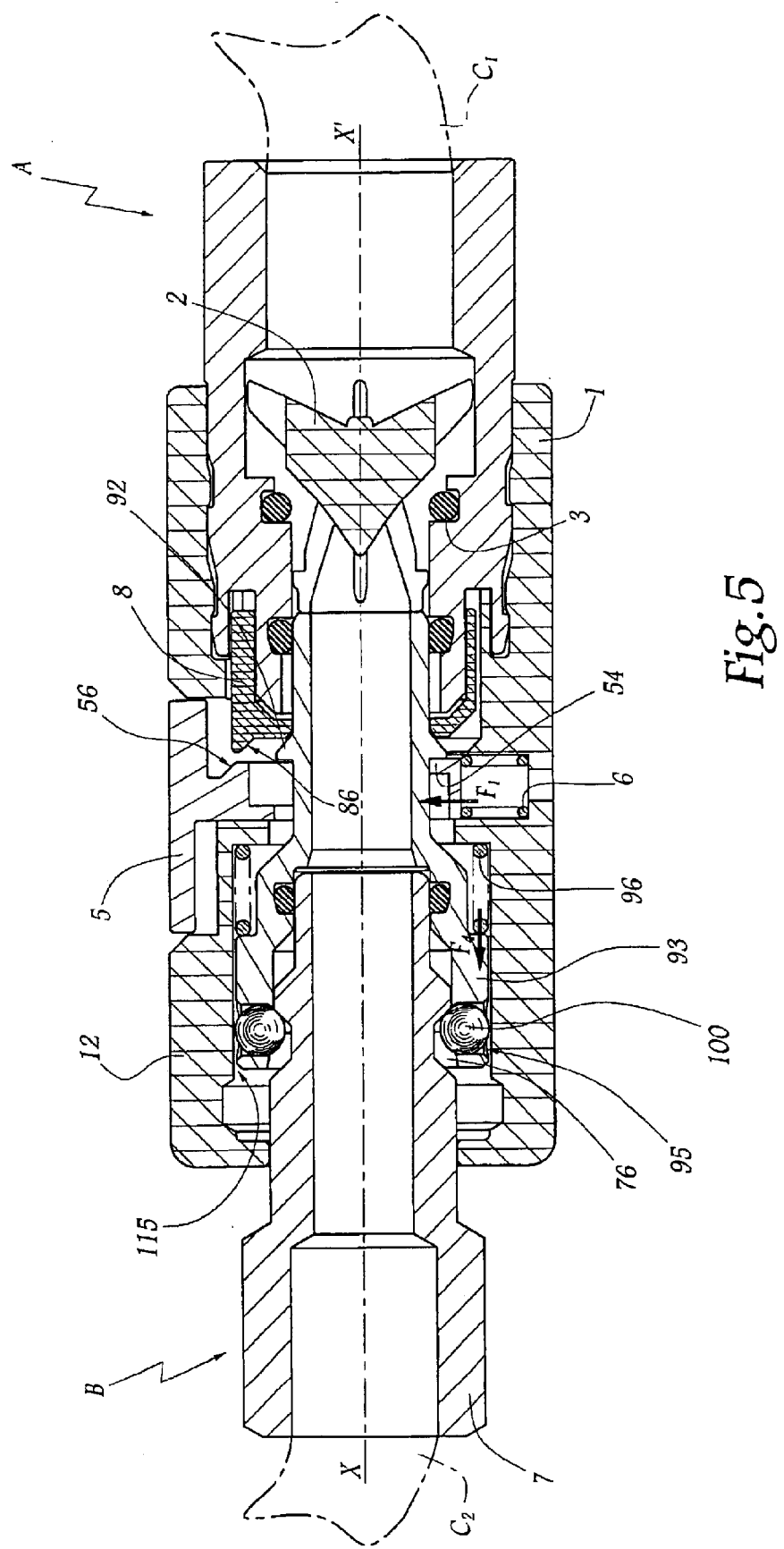
FIG. 5 is a longitudinal section through a coupler in accordance with a second form of embodiment of the invention in a configuration similar to that of FIG. 1.

In the second form of the embodiment of the invention shown in FIGS. 5 to 7, the elements similar to those of the first embodiment bear identical references. The female (A) and male (B) elements of the coupler are intended to fit axially in each other and there are provided in the body 1 of the female element latch 5 and a piston 8 similar to those of the first embodiment, these members being provided with respective surfaces 56 and 86 for blocking in configuration of purge or communication with the air of the inner volume of the downstream pipe $C_2$ and of the male connector 7. A spring 6 exerts on the latch 5 an effort or force $F_1$ directed upwardly in FIG. 5.

An intermediate piece 9 is housed in the principal conduit of the body 1 of the female element and comprises a cylindrical part 91 provided with a flange 92, this part 91 having substantially the same outer geometry as the front part of the body 7 of the first embodiment. The piece 9 also comprises a part 93 of larger diameter than part 91 and defining a housing for receiving a male connector 7 of the type described in Patent FR-2-724 710.

Part 93 is provided, on its circumference, with a plurality of housings 95 for receiving balls 100 capable of being engaged in a peripheral groove 76 of the body 7 which they then retain in position in the part 93. A spring 96 exerts on the piece 9 an effort $F_4$ directed towards the opening 111 of the conduit 11.

Functioning is as follows:

In the configuration of FIG. 5, the tooth 54 of the latch 5 maintains the piece 9 in configuration of circulation of fluid through the coupler, the effort F4 exerted by the spring 96 in that case being overcome and the balls 100 then being opposite a cylindrical part 115 with rectilinear generatrix of the conduit 11, with the result that they are engaged in the groove 76 and retain the connector 7 captive.

When the coupler is to be unlocked, an effort $F_2$ is exerted on the latch 5, which has the effect of disengaging the tooth 54 with respect to the flange 92 which then comes into abutment against the second tooth 55 of the latch 5. As previously, under the effect of the flow E of the fluid under pressure, the piston 8 is displaced by the effort $F_3$ in the direction of the latch 5, to such a point that its surface 86 comes into contact with the corresponding surface 56 of the latch 5. The effort $F_4$ due to the spring 96 slightly displaces the piece 9 inside the conduit 11, the balls 100 remaining engaged in the groove 76 and thus retaining the connector 7 captive.

When the pressure in the pipe $C_2$ and in the pieces 7 and 9 has decreased due to the organized leakages represented by the flow E', the piston 8 releases the latch 5 which moves, under the effect of the effort $F_1$ due to the spring 6, towards the position of FIG. 7 where the flange 92 is released from the tooth 55, this having the effect of allowing the spring 96 to push the piece 9 in the direction of the opening 111 of the conduit 11. The balls 100 are thus brought opposite an inner radial groove 121 made in the piece 12, which makes it possible to extract the balls 100 from the groove 76 of the body 7 of the connector B and thus to release this connector.

Whatever the form of embodiment in question, the elements constituting the coupler are advantageously made of a metallic material or a plastics material resisting the pressures of the fluid to be conveyed, and chosen as a function of the nature of the fluid.

What is claimed is:

1. Quick coupler for selectively connecting and disconnecting two pipes through which a fluid under pressure passes, said coupler comprising a male and a female element adapted to fit axially in each other, a body of the female element carrying a latch resiliently biased by elastic means, said latch being mounted to slide transversely with respect to a conduit defined through said body and having an opening for receiving said male element or a piece displaced by said male element therethrough, a wall defining the opening of said latch being equipped with teeth offset with respect to one another along a median axis of said opening, said male element or said piece being provided with a shoulder adapted to rest selectively against one of said teeth, a safety member movably mounted within said female element so as to be subjected to pressure exerted by the fluid, and said safety member being provided with a surface adapted to come into abutment on a complementary surface of said latch to block the movement of said latch by said elastic means until pressure of the fluid within the quick coupler drops to a pressure which is safe to permit said male element to be disconnected from said female element.

2. The quick coupler of claim 1, wherein said safety member is movable with respect to the body of said female element, both under the effect of the pressure exerted by the fluid and under the effect of a force of reaction exerted by said latch being urged by said elastic means.

3. The quick coupler of claim 1, wherein said surface formed on said safety member and on said complementary surface of said latch are inclined with respect to a direction of relative displacement of said male and female elements and with respect to the transverse direction of slide of said latch in said body of said female element.

4. The quick coupler of claim 3, wherein said surface and said complementary surface are inclined towards an axis parallel to a longitudinal axis of the quick coupler in a direction upstream of said the quick coupler.

5. The quick coupler of claim 1, wherein said safety member is formed by a piston which is movable in a direction substantially parallel to a direction of relative displacement of said male and female elements.

6. The quick coupler of claim 5, wherein said piston comprises an orifice through which said male element or of said piece displaced by said male element are extendable.

7. The quick coupler of claim 1, wherein said elastic means is adapted to provoke separation of the abutting surface of said latch and said complementary surface of said safety member when the pressure of the fluid in the fluid coupler is lesser than a pre-established value.

8. The quick coupler of claim 1, wherein said body of said female element comprises a principal part in which is immobilized a secondary part, said second part of said female element being connected to one of the two pipes, immobilization being effected by catches carried by said secondary part catching with complementary catches carried by said principal part.

9. The quick coupler of claim 1, wherein said piece displaced by said male element includes an intermediate piece which receives a body of said male element, and said intermediate piece being provided with means for locking said body thereto, said means for locking being adapted to release said body of said male element when said latch is displaced from said safety member under the effect of the force of said elastic means.

10. The quick coupler of claim 9, wherein said intermediate piece is elastically urged towards a position where said locking means releases said body of said male element from said intermediate piece.

* * * * *